May 2, 1933.                G. B. COE                1,907,041
                    APPARATUS FOR WORKING METAL
                  Filed April 29, 1930        8 Sheets-Sheet 1

INVENTOR
George B. Coe
BY
Emery, Booth, Varney
& Whittemore
ATTORNEYS

May 2, 1933.                 G. B. COE                 1,907,041
                      APPARATUS FOR WORKING METAL
                    Filed April 29, 1930        8 Sheets-Sheet 5

INVENTOR
George B. Coe
BY Emery, Booth,
Varney & Whittemore
ATTORNEYS

May 2, 1933.   G. B. COE   1,907,041
APPARATUS FOR WORKING METAL
Filed April 29, 1930   8 Sheets-Sheet 6

INVENTOR
George B. Coe
BY Emery, Booth,
Varney & Whittemore
ATTORNEYS

May 2, 1933.                G. B. COE                1,907,041
                    APPARATUS FOR WORKING METAL
                    Filed April 29, 1930    8 Sheets-Sheet 7

INVENTOR
George B. Coe
BY Emery, Booth,
Varney & Whittemore
ATTORNEYS

Patented May 2, 1933

1,907,041

UNITED STATES PATENT OFFICE

GEORGE B. COE, OF WATERBURY, CONNECTICUT, ASSIGNOR, BY MESNE ASSIGNMENTS, TO TUBE REDUCING CORPORATION, OF WILMINGTON, DELAWARE, A CORPORATION OF DELAWARE

APPARATUS FOR WORKING METAL

Application filed April 29, 1930. Serial No. 448,223.

This invention relates to method of and apparatus for working metal, whereby the cross-sectional area of the metal stock is reduced with an accompanying elongation of the stock; the object of the invention being to provide method and apparatus whereby the desired results may be accomplished in a practicable and efficient manner.

In a co-pending application I have disclosed apparatus of the intermittent acting class in which the stock is reduced upon a mandrel, the apparatus including improvements in the reducing tools or rockers, improved driving means, improved mandrel manipulating means, stock guide means, run-out mechanism, and certain stock manipulating mechanism referred to as the "mechanical" type. The present invention employs the same mechanisms as those employed in the "mechanical" apparatus except the stock manipulating apparatus and as to this, the present invention employs somewhat different apparatus. It may be referred to, but merely for the sake of providing a ready designation, as the "pneumatic" type. In addition to the stock gripping-and-rotating and gripping-and-feeding means provided by the "mechanical" apparatus, the present apparatus includes means for holding the stock independently of these means, but of course coordinating with them. As a ready identification this additional means may be referred to as the "main clamp" though this specific designation is not to be considered as in any sense a limitation.

The "main clamp" is used to hold the stock against longitudinal movement at such times as may be desired and when it is not held by other mechanisms. It may be used with apparatus other than that shown here and may be operated by other than pneumatic means.

The various objects and advantages of the invention will be apparent from the following description of a selected illustrative embodiment thereof in apparatus shown in the accompanying drawings wherein.

Figures 1, 2:
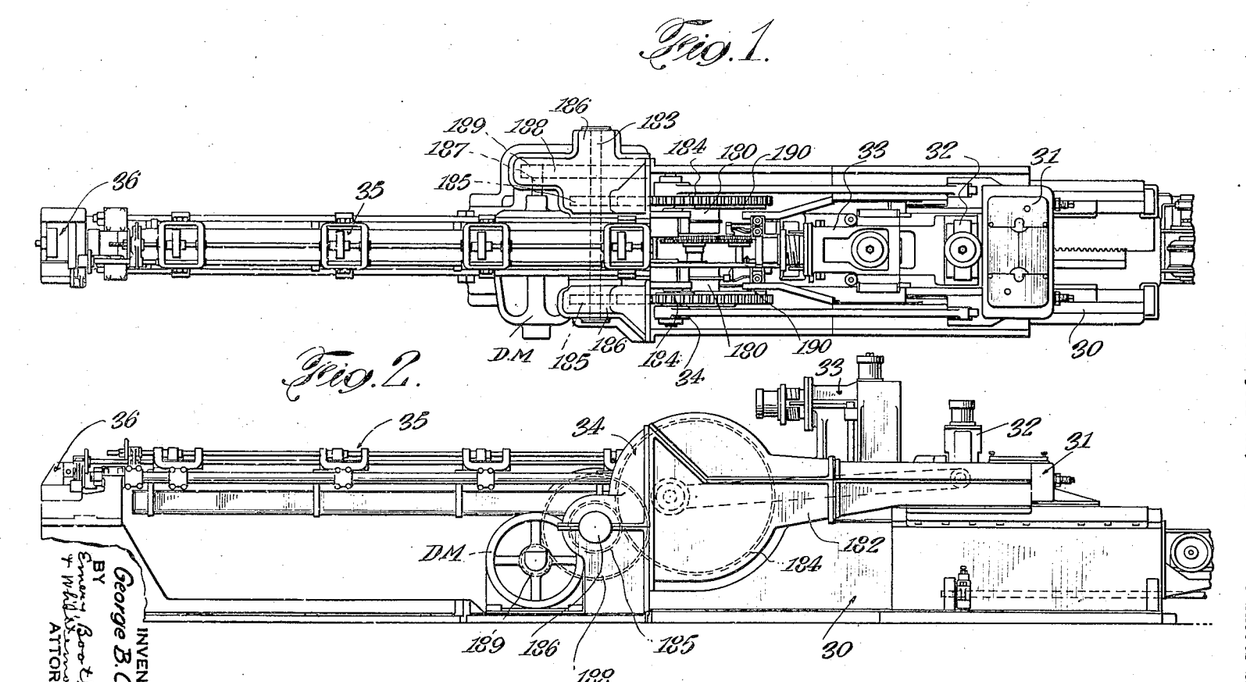
Fig. 1 is a top plan view.
Fig. 2 is a side elevation.

Referring to Figs. 1 and 2, the apparatus comprises a bed 30, reducing mechanism 31, driving mechanism 34, mandrel holding and turning mechanism 36, stock guiding mechanism 35 and stock run-out mechanism (not shown) all of which is the same as in my other application so need not be described here since the present invention may be fully understood without it. The new mechanisms to be described herein comprise the stock holding mechanism or main clamp 32; and the stock gripping - feeding - and-turning mechanism 33.

*Stock holding mechanism—the main clamp*

Figure 5:
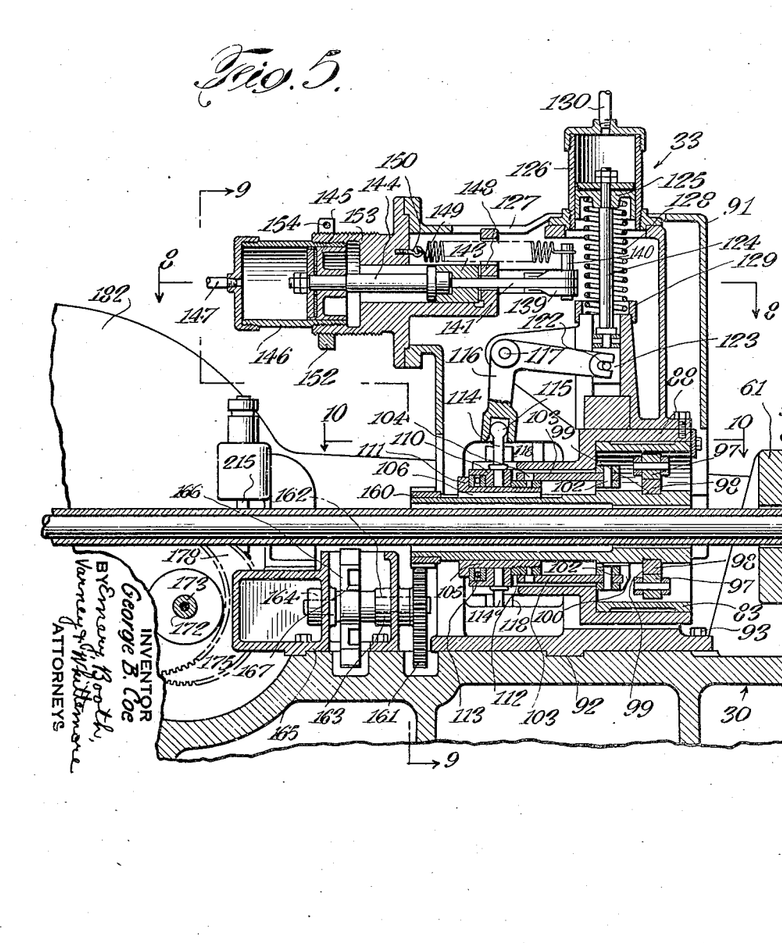
Fig. 5 is a central vertical section.

As shown in Fig. 5 the rockers 40 have mating tapered portions for causing a swaging or reducing action upon the stock when the saddle 42 is reciprocated. If this taper is sufficiently long and gradual the stock will not be given a strong tendency to move longitudinally while the rockers are acting but if the taper is abrupt there may be a strong tendency to move the stock. The amount of side opening or flaring from round of the cross section of the rocker faces may also have an influence upon the tendency of the stock to move. Furthermore, the taper of the mandrel M will have an influence upon the tendency of the stock to move.

A certain amount of restraint against longitudinal movement is supplied by the mandrel but when the mandrel is long and flexible this restraint may not be sufficient. More particularly, when the end of a new length of stock is being introduced to the reducing devices, is the tendency to move pronounced.

To take care of such conditions and hold the stock against longitudinal movement the present holding mechanism is provided. It may be used or not as required.

Figure 6:
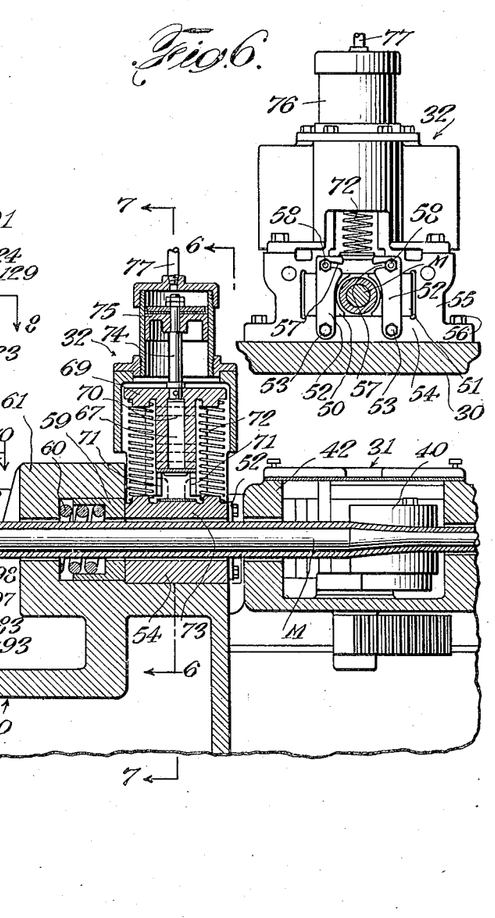
Fig. 6 is an elevation partly in section taken on the line 6—6 of Fig. 5.
Figure 7:
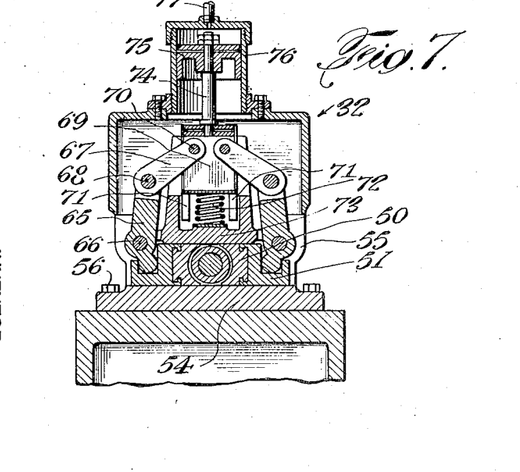
Fig. 7 is a transverse vertical section on the line 7—7 of Fig. 5.

This mechanism is best shown at the right hand side of Fig. 5 and in Figs. 6 and 7. Here (Fig. 7) the clamp jaws 50 are seen to have a longitudinally splined connection with jaw slides 51 providing interchangeability for the jaws for different sizes of stock. The jaws may be retained (Fig. 6) by latches 52 pivoted on cap bolts 53 threaded into the base 54 of the holding mechanism frame 55 which base is fastened upon the bed 30 by cap bolts 56. The latches have notches 57 engaging keepers in the form of bolts 58 which may clamp the latches in holding position. The jaws are hardened and roughened interiorly as by having sharp circumferential ridges cut therein so as to take a good grip of the stock.

It may be desirable in order to avoid breakage not to have the jaws held absolutely against rearward movement but only substantially so. To provide for this, the rear ends of the jaws engage an abutment 59 pressed forward by a very heavy spring 60 placed in the recess of a bed extension 61, the forward movement being limited, however, by engagement of the abutment against the rear end of the jaw holding frame 55.

The jaw slides 51 are operated by the cylindrical-ended arms of toggle levers 65 pivoted by journals 66 upon the frame 55. To clamp the stock the upper ends of the toggle levers 65 are pushed outward by toggle links 67, the links 67 being connected to the levers 65 by pivot pins 68 and at their other ends being connected to a toggle block 69 by pivot pins 70. The block operates in vertical guides 71.

Normally the block 69 is held in its upper position to keep the jaws open by coil springs 72 resting upon a transverse member 73 of the frame 55. The block 69 is pushed down to close the jaws by a piston rod 74 connected thereto which is actuated by a piston 75 operating within a cylinder 76 secured to the frame 55. Actuating fluid is admitted to the cylinder by way of a supply pipe 77. The pipe may also be used for exhaust. The valve means for controlling the supply and exhaust of fluid to said cylinder are described hereinafter.

*Stock feeding and turning mechanism*

This mechanism includes means for gripping the stock when either the feeding or turning devices operate. This provides a through feed for the stock whereby successive lengths of stock may be fed end-to-end from the rear part of the machine where the stock is introduced to the front of the machine where finished stock is delivered. The gripping means preferably operate independently of the feeding and turning devices so that variations in size of stock will not cause a variation in the amount of feeding and turning.

According to the preferred cycle of operation the tube is loosened from the mandrel when it is to be fed forward relative thereto and is squeezed down upon the mandrel when it is to be rotated therewith.

Turning of the stock might be accomplished wholly by turning of the mandrel but when heavy stock is worked it has considerable turning inertia and in order to turn quickly and accurately in such cases, the present mechanism operating directly upon the stock is provided.

Other advantages will be realized by the mechanism here employed but such advantages need not be pointed out in detail. It will be sufficient to give a detailed description of the one embodiment of this mechanism which has been chosen for illustrative purposes. This mechanism is shown in Figs. 5, 8, 9, 10, and 11.

Figure 11:
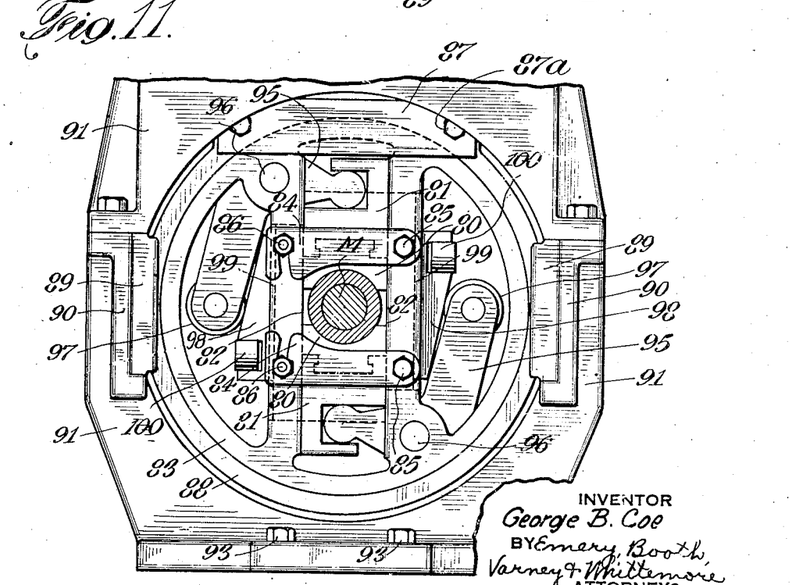
Fig. 11 is a right end elevation of Fig. 10.

As best shown in Fig. 11, cooperating hardened and interiorly roughened clamping jaws 80 are splined to jaw slides 81, the jaws and slides being operative along guides 82 formed on a rotary housing 83. The jaws are retained against longitudinal movement relative to the holders by any suitable means. In the present embodiment abutments of the housing 83 retain their rear ends while latches 84 retain their front ends. The latches are pivoted upon bolts 85 and are retained by keeper bolts 86. By this arrangement the jaws are readily interchanged through the front of the slides as when operating upon different sizes of stock.

The housing 83 is rotatably but non-slidably mounted in a reciprocatory frame 88, being retained therein by one or more plates 87 held by bolts 87a. The frame 88 is provided with slide ribs 89 movable along guides 90 formed on a fixed frame 91 secured to the bed 30 of the machine by jogs 92 and cap screws 93.

Referring again to Fig. 11 in particular, the jaw slides 81 are moved inwardly and outwardly by the round-ended arms of jaw actuating levers 95 pivoted to the rotatable housing 83 by pins 96. The other arms of the levers 95 carry rollers 97 riding upon wedges 98 suitably guided in channels 99 formed in the housing.

Each wedge is notched (Fig. 11) to receive the rounded end of one arm (Fig. 10) of a wedge-actuating lever 100. The lever 100 is pivoted upon the rotatable housing by a pivot pin 101. The other end of each lever 100 is pivotally connected by a pin 102 to a link 103. Each link at its other end is pivoted to a link stud 104 secured in a sleeve 105 (Fig. 5) splined by a feather 106 to the rotatable housing 83 so as to be rotatable therewith but slidable relative thereto.

Means are provided for actuating the sleeve to operate the clamping jaws regardless of the rotated position of the housing. These means comprise parts located upon and reciprocable with the longitudinally movable frame 88. Upon the sleeve 105 there is disposed a non-rotatable collar 110 secured between a flange 111 on one end of the sleeve and an adjusting ring 112. In the present instance the ring 112 carries the studs 104. Ball bearings 113 are located between the sleeve and collar.

Actuating studs 114, 114a are made fast in the collar 110. The upper stud 114 has a ball joint connection 115 with a bell crank lever 116. The lever 116 is pivoted upon a pin 117 secured to the reciprocatory frame 88.

The moving force applied to the stud 114 by the lever 116 is divided with the opposite stud 114a by parallel arms 118 fast to a vertical shaft 119 turnable in bearings 120 integral with the reciprocatory frame 88. The ends of the arms 118 have slots 121 engaging the studs 114, 114a to provide the necessary movement.

The other end of the bell crank lever 116 is slotted at its end to cooperate with a pin 122 fixed in a vertically movable piston slide 123. The slide is attached by a piston rod 124 to a clamp piston 125 movable in a clamp cylinder 126. The cylinder is attached to the reciprocatory frame 88 and an elongated slot 127 is provided in the fixed frame 91 to accommodate the cylinder movements.

A spring 128 pressing against the lower side of the piston and against a seat 129 formed on the longitudinally movable frame 88 tends to move the piston upward and release the clamping jaws 80, while fluid admitted to the upper side of the piston in the cylinder by the pipe 130 will move the piston downward and clamp the jaws. As described hereinafter suitable valve means are provided to control the flow of fluid to the cylinder 126.

The arrangement described is one form of mechanism for operating the jaws independently of the rotation of the housing 83 by the turning devices or the reciprocation of the longitudinally movable frame 88 by the feeding devices. However, the clamping jaws cooperate with both the feeding and turning devices.

Means are provided for effecting the feed of the stock after it has been gripped by the clamping devices. The illustrative device for this purpose is best shown in Figures 5, 8, 9 and 10. In the present instance it is designed to actuate the reciprocatory frame 88 together with all parts mounted thereon, which includes the clamping jaws 80, rotatable housing 83 and the clamping cylinder 126 together with all linkages and connections between the piston operating in the clamping cylinder and the clamping jaws.

Figure 10:
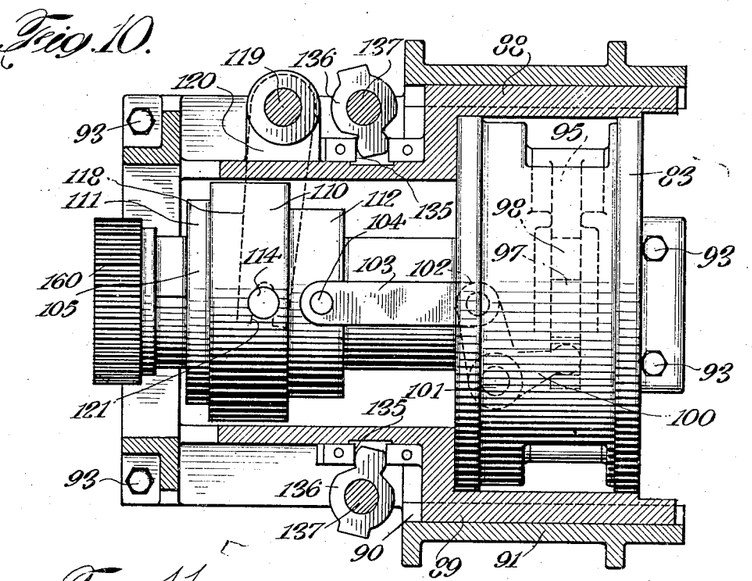
Fig. 10 is a horizontal section on the line 10—10 of Fig. 5.

As shown in Figure 10, the longitudinally movable frame 88 is provided on each side with a slot 135 cooperating with the rounded ends of oscillating arms 136 mounted upon vertical shafts 137. The shafts 137 (Fig. 9) are mounted in bearings 138. The movable frame 88 is thus subjected to equal forces on opposite sides which are applied in a plane common to the longitudinal axis of the stock, assuring smooth action free from twisting or binding or the likelihood of bending or breaking the mandrel.

The vertical shafts 137 (Fig. 8) at their upper ends are provided with rigid arms 139 pivoted by pins 140 to connecting rods 141. The connecting rods 141 are pivoted by wrist pins 142 to a piston rod guide block 143. The guide block 143 is actuated through a piston rod 144 by a feed piston 145 working in a feed cylinder 146. Fluid is admitted to the cylinder by an inlet and outlet pipe 147 controlled by suitable valve mechanism such as that disclosed hereinafter.

Figure 8:
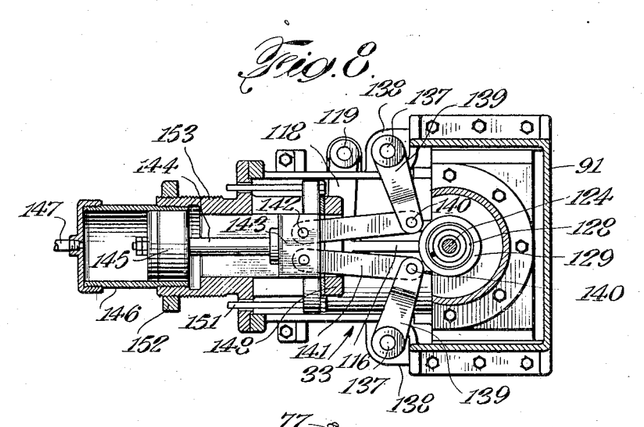
Fig. 8 is a horizontal section on the line 8—8 of Fig. 5.
Figure 9:
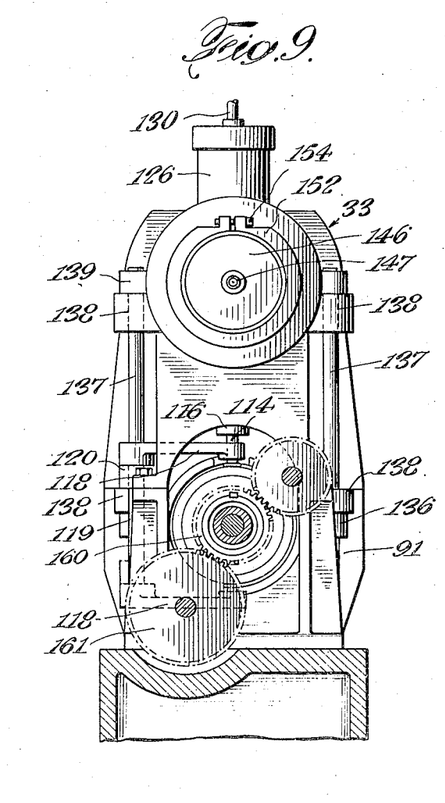
Fig. 9 is a transverse vertical section on the line 9—9 of Fig. 5.

The piston block and associated parts are limited in outward or feeding direction by a fixed abutment 148. The block and associated parts (including the reciprocatory frame 88 and its associated stock clamping parts) are returned by heavy coil springs 149 connected to extensions of the pivot pins 140 and the anchor hooks 150. The parts are limited in their return movement by stop pins 151, secured to lateral extensions of the block 143, coming into engagement with an adjustable abutment 152. One mode of providing set adjustment of the abutment 152 consists, as illustrated, in threading the same on a cylinder base 153 secured to the fixed frame 91, splitting the ring-shaped abutment and clamping it together in adjusted positions by bolts 154.

*Gearing*

Turning may be accomplished by any suitable mechanism. That illustrated comprises, (Fig. 5) a gear 160 secured on the rear cylindrical end of the rotatable housing 83 which is driven by a gear 161 secured to a Geneva gear shaft 162. The shaft 162 operates within bearings 163, 164 provided on a fixed gear frame 165 bolted upon the bed 30.

Figure 12:
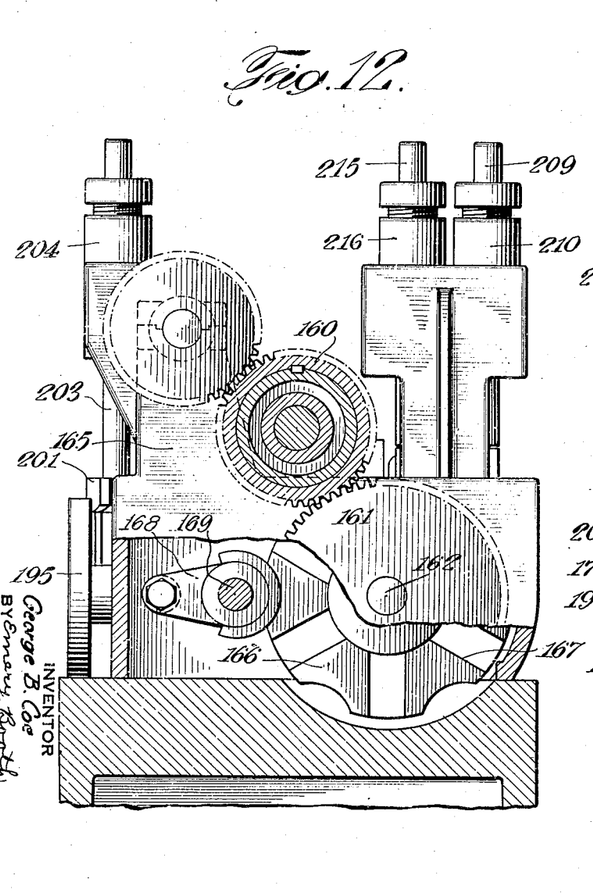
Fig. 12 is a transverse vertical section on the line 12—12 of Fig. 4.
Figure 13:
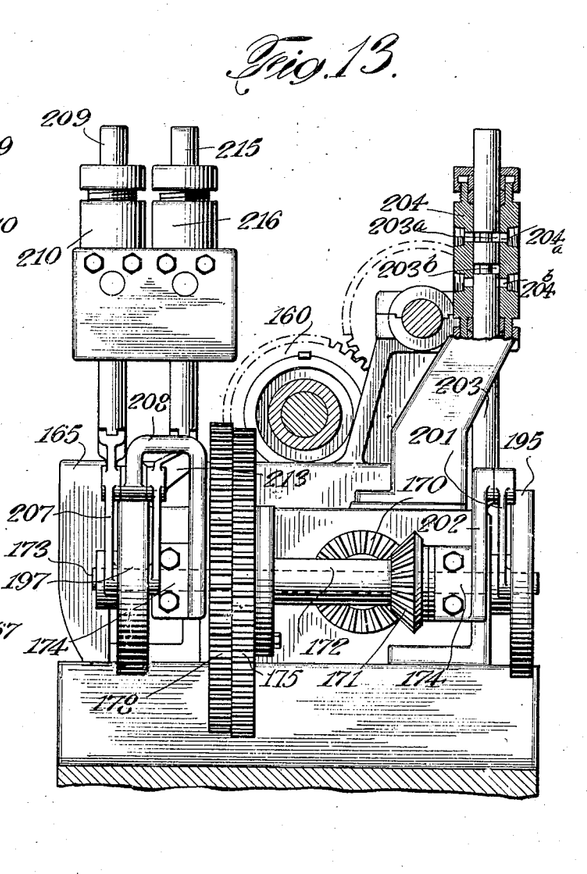
Fig. 13 is a transverse vertical section on the line 13—13 of Fig. 4.

As shown in Fig. 12, the disc 166 of the Geneva gear is provided with a sufficient number of radial slots 167 (six as shown) to give smooth working cooperation with the Geneva arm 168 rigid with the stub shaft 169. The stub shaft 169 (Fig. 13) carries bevel gear 170 meshing with and driven by a bevel gear 171 fast on a sleeve shaft 172. The shaft 172 is rotatably mounted upon a cam shaft 173 which in turn is rotatably mounted within bearings 174 secured to the gear frame 165.

Because of the fact that the swaging devices release the stock for only a relatively short period at each end of the stroke it is desirable to provide a quick motion for the stock feeding and turning devices. In the present instance this is accomplished for turning (Fig. 3) by eccentric gears 175, 176 on the sleeve shaft 172 and a crank shaft 177 respectively. A pair of concentric gears 178, 179 on the cam shaft 173 and the crank shaft 177 respectively drive the feed and clamp controlling devices. In the present instance the turning devices are driven directly through gearing, i. e., mechanically, while the clamping and feeding devices are driven pneumatically and controlled mechanically. In the latter case cams provide the quick motion.

The crank shaft (see also Fig. 4) operates in bearings 180 on the bed and is provided at each end with crank pins 181 driving the connecting rods 41 attached to the saddle. Two connecting rods, thus placed, give an equalized drive to the saddle. This arrangement also provides for locating the crank shaft very close to the mandrel and stock since the cranks do not need rotating clearance beneath the stock as would be the case if only a single crank were employed. This gives a drive located as nearly as conveniently possible in line with the longitudinal axis of the stock and mandrel. Guards 182 may be provided on the side of the frame to encase the cranks and connecting rods.

The crank shaft (Figs. 1 and 2) is driven from a counter shaft 183 through gears 184, 185 fast on the crank and counter shafts respectively. These gears are arranged in two identical sets placed on opposite sides of the axis of the stock in order to clear the same and give equalized drive. The counter shaft is rotatably mounted in bearings 186 provided on the bed 30. The counter shaft is driven from the shaft 187 of a drive motor D. M. mounted on the bed through gears 188, 189 on the counter and motor shafts respectively.

The motor and its controls are of such a nature as to provide "inching" of the machine whereby operations may be stopped or started at any stage. For smoothness of operation the crank shaft may be counterweighted to balance the crank pin and related parts by weights 190 placed on the large gears 184 which incidentally act as fly wheels.

Valves and cams

Figure 3:
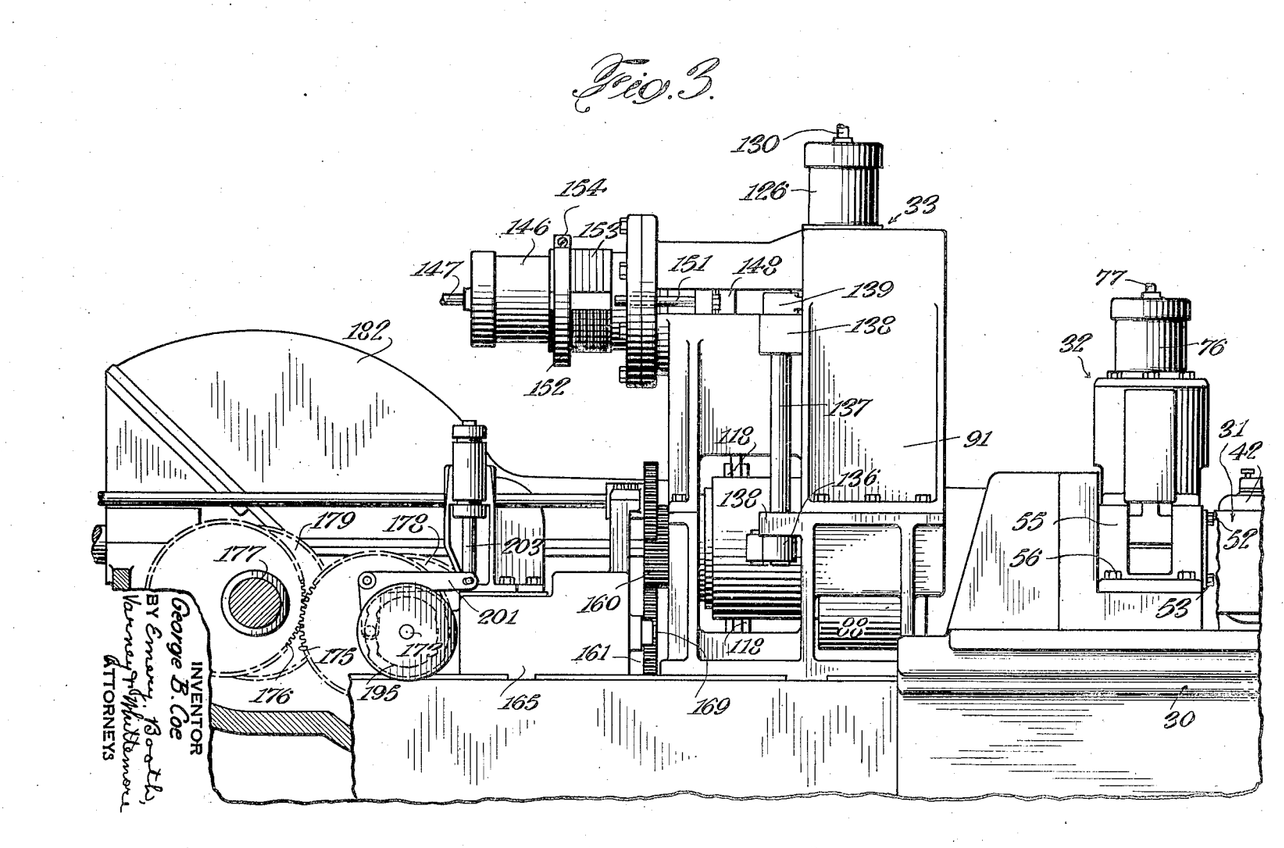
Fig. 3 is an enlarged side elevation of the stock manipulating mechanism with the protective guards removed.
Figure 4:
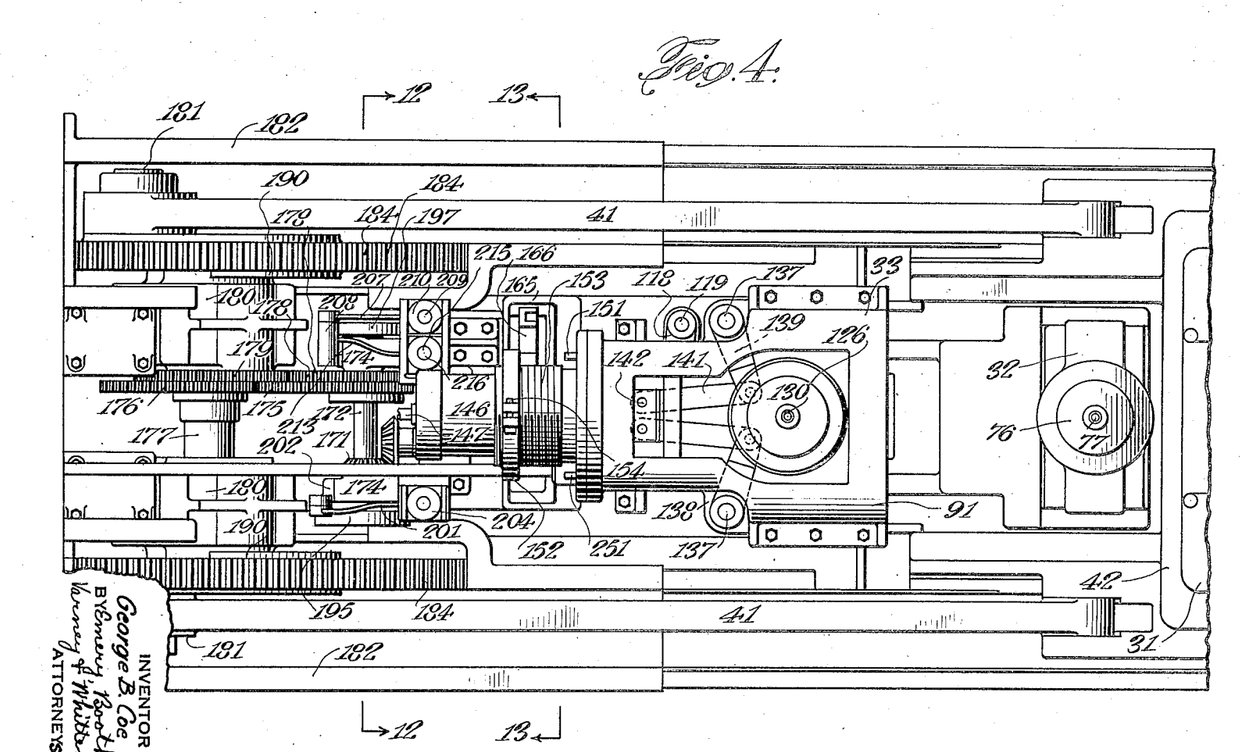
Fig. 4 is a plan view of the same.
Figure 14:
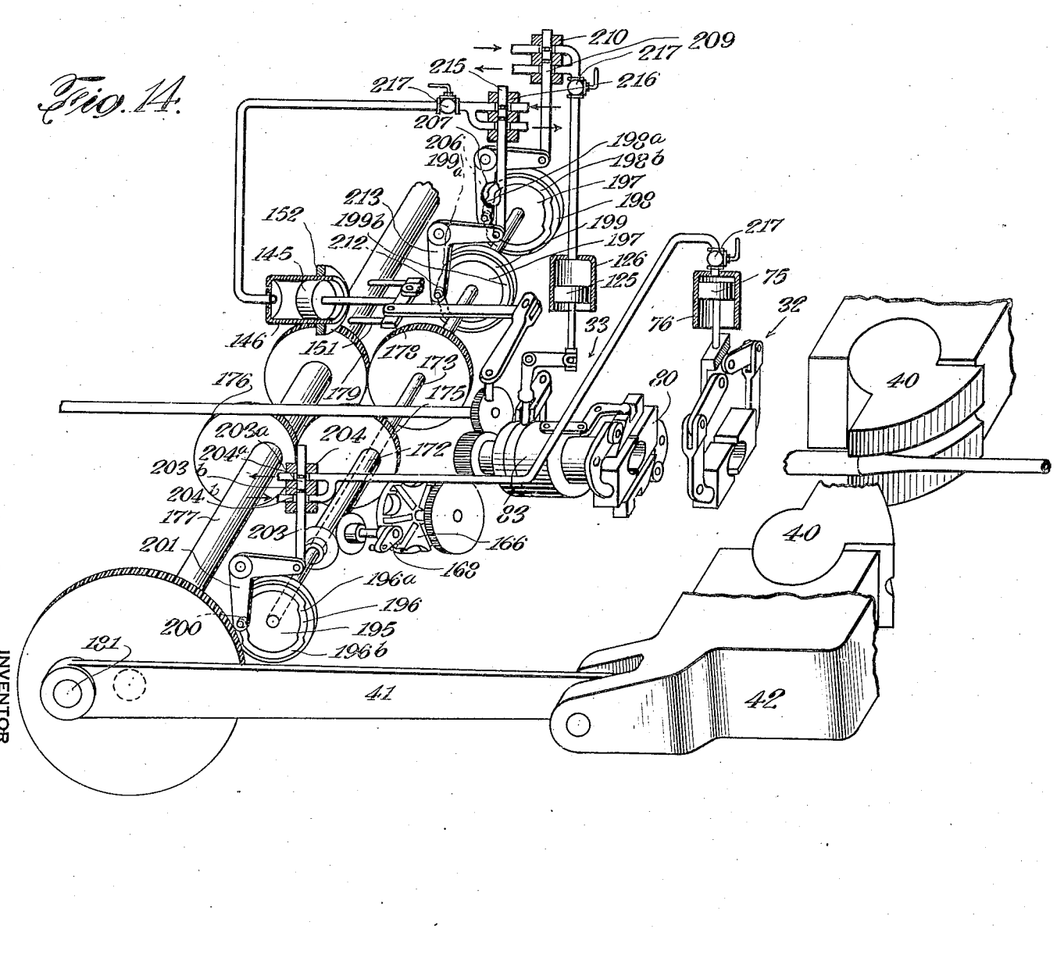
Fig. 14 is a schematic view of cams, valves and cylinders which they supply.

Means are provided for controlling and synchronizing the operation of the pistons in the main clamp cylinder, the feed-and-turn clamp cylinder and the feed cylinder. This is shown in Figs. 3, 4 and 14.

The cam shaft 173 is provided with a mainclamp cam 195 on one end having a cam groove 196 and at the other end a cam disc 197 providing a feed-clamp cam groove 198 on one side and a feed cam groove 199 on the other side.

The main clamp in the present case is designed to clamp and release twice each cycle or revolution of the crank shaft so the main clamp cam groove 196 is formed with two inner concentric portions 196a and two outer concentric portions 196b, the outer being used to clamp the main clamp jaws at each stroke of the saddle and the inner being used to release at each end of the stroke.

Similarly the feed-turn clamp is designed to clamp and release twice each cycle but reversely in time to the main clamp. To effect this the cam groove 198 is provided with two inner concentric portions 198a for clamping and two outer concentric portions 198b for releasing.

The feed device is designed to operate only once each cycle so the feed cam groove 199 is provided with a single inner concentric portion 199a for feeding and a single outer concentric portion 199b for idling.

The main clamp cam actuates a cam follower roller 200 secured to a cam lever 201 pivoted upon a fixed bracket 202. The other end of the cam lever 201 actuates a valve plug 203 working in a valve body 204. The valve plug is provided with annular grooves 203a, 203b cooperating with outlet groove 204a and inlet groove 204b respectively of the valve body.

The feed-turn clamp cam actuates a cam follower roller 206 secured to a cam lever 207 pivoted upon a fixed bracket 208. The other end of the cam lever 207 actuates a valve plug 209 working in a valve body 210. The valve construction is identical with that just described for the main clamp.

The feed cam actuates a cam follower roller 212 secured to a cam lever 213 pivoted upon the fixed bracket 208. The other end of the cam lever 213 actuates a valve plug 215 working in a valve body 216. The valve construction is identical with that already described.

Any suitable means may be provided for eliminating the action of the main clamp, the feed clamp or the feed means. For example, hand valves 217 may be interposed in the conduits which serve the operating cylinders 76, 126 and 146.

*Operation*

According to the preferred method of operating, the metal is reduced with an accompanying increment of feed and consolidated without an increment of feed. By "consolidated" is meant the removal of longitudinal ribs or fins, the smoothing out of the stock to approximately uniform wall thickness, the rounding up of the stock from oval condition with accompanying loosening from the mandrel, and such effects upon the structure of the metal as may be produced, whether these actions be effected separately or collectively. In the present apparatus this gives rise to a preferred cycle of operation, which is as follows: first, in the presence of an increment of feed, the "reducing" stroke occurs while the saddle is moving forward, i. e. to the right (Fig. 5); next at the end of the reducing stroke after the swaging devices have released the stock, the turning of the stock occurs to bring that portion of the stock which received the least reducing pressure into position in the rocker grooves where it will receive a greater pressure; next the consolidating stroke occurs while the saddle is moving rearward; then, after the swaging devices have released the stock, the increment of feed occurs and the cycle is repeated.

In Fig. 5 and the schematic Fig. 14, the parts are shown in the positions they occupy at the beginning of the cycle as set out above. The saddle is in its rearmost position where the stock stands clear of the reducing devices; the main clamp 32 is released or off and its piston 75 is at the head end of its cylinder 76; the clamp jaws 80 for the stock feed-turn mechanism 33 are on and the piston 125 at the crank end of its cylinder 126; an increment of stock has been fed, the feed frame 88 having been moved forward by its piston 145 which is at the crank end of its cylinder; and the turning mechanism is idle (see Fig. 12) with the knuckle of the Geneva arm 168 turning in an arcuate notch in the periphery of the Geneva disc 166 which is thereby held stationary.

As soon as the feed has taken place the feed-turn clamp piston is returned by spring action to the head end of its cylinder to release the clamp jaws 80. The feed frame 88 is then returned by spring action toward the rear until the stop pins 151 strike the adjusting ring 152. This determines the amount of feed that will occur on the next forward movement of the feed frame because the feed piston always moves forward to the same position limited by its guide block 143 striking the abutment 148. Before the swaging devices start acting to reduce the stock the main clamp jaws are put on by the main clamp piston moving down.

Following the reducing stroke the main clamp again releases the stock and the feed-turn clamp grips it. Then the Geneva disc is moved to turn the rotatable housing 83 and stock gripped in it by the desired amount. Before the reducing devices start their consolidating action on the return stroke of the saddle the feed clamp releases the stock and the main clamp again grips it.

Upon the completion of the consolidating action the main clamp releases the stock, the feed-turn clamp engages it and the feed cylinder is actuated. This brings the parts back into position they had at the beginning of the cycle described.

It will be understood that the invention may be variously embodied within the scope of the subjoined claims.

What I claim is:

1. In apparatus for reducing tubular metal stock upon a mandrel M by swaging rockers 40 mounted in a reciprocatory saddle, the combination with reducing devices 40 of mandrel turning and holding mechanism 36; a main clamp including clamp jaws 50 splined in holding members 51, a spring-backed abutment 59 providing limited longitudinal movement to the jaws and a fluid operated piston 75 for actuating said jaws; a clamp-feed-and-turn mechanism 33 including clamp jaws 80 splined in holding members 81, a rotatable housing 83 carrying said jaws, a reciprocatory frame 88 carrying said housing, a fluid operated clamp piston 125 for actuating said jaws, connections between said clamp jaws and said piston including linkages and a sleeve 105 slidably splined on said housing, a fluid operated piston 145 for actuating said frame to feed the stock, means including a gear 160 on the housing, Geneva gear 166, 168 and eccentric gears 175, 176 for turning said housing; and means including valves 203, 209, 215 and valve operating cams 196, 198, 199 for controlling the action of said fluid operated pistons to synchronize the action of said clamping and feeding and turning devices with the action of said reducing devices.

2. In apparatus for reducing metal stock by swaging it in successive increments, comprising in combination a reducing device, a main clamp, a fluid actuated piston for operating said clamp, a feed-turn clamp, a fluid actuated piston for operating said second clamp, a rotatable-reciprocable housing carrying said second clamp, a fluid actuated piston for reciprocating said housing, mechanical means for rotating said housing, and mechanical means for controlling the action of said fluid-operated pistons to synchronize the action of said clamping and reciprocating and turning devices with the action of said reducing device.

3. In apparatus for reducing stock by swaging it in successive increments, comprising in combination, a reducing device, clamp jaws for gripping said stock, a rotatable housing carrying said jaws, a reciprocable frame carrying said housing, means mounted partly on said housing and partly on said frame for actuating said jaws, said means acting in balanced manner from opposite sides of said stock axis, means for rotating said housing periodically, means for reciprocating said housing and means for coordinating the action of said jaw-actuating, housing-rotating and housing-reciprocating means.

4. In apparatus for reducing metal stock by swaging it in successive increments, comprising in combination, a reducing device, clamp jaws for gripping said stock, a rotatable element carrying said jaws, a reciprocable element carrying said rotatable element, means to operate said jaws, means to rotate said rotatable element, means to reciprocate said reciprocable element, said jaws being constructed for the complete passage of stock therethrough, and means for coordinating the action of said parts.

5. In apparatus for reducing metal stock by swaging it in successive increments, comprising in combination, a reducing device, clamp jaws to grip said stock, a rotatable reciprocable element carrying said jaws, a frame carrying said element, means to operate said jaws, means to rotate and slide said element, said jaws being constructed for the complete passage of said stock therethrough and means for coordinating the action of said parts.

6. In apparatus for reducing metal stock by swaging it in successive increments, comprising in combination, a reducing device, means for intermittently gripping the stock, means for turning the stock at times when gripped, means for feeding the stock at times when gripped, the gripping means being common to said turning and feeding means and being constructed for the complete passage of said stock therethrough, and means for coordinating the action of said parts.

7. In apparatus for reducing metal stock by swaging it in successive increments, comprising in combination, a reducing device, means for turning and translating the stock, means for holding the stock to inhibit unauthorized turning and translation, said means providing limited translation, means to resist said limited movement of translation, and means to coordinate the action of said parts.

8. In apparatus for reducing metal stock by swaging it in successive increments, comprising in combination, a reducing device, means for turning and translating the stock, means for clamping the stock and holding it independently of said turning and translating means, resilient means providing limited movement of said stock even when held by said clamping means, and means to coordinate the action of said parts.

9. In apparatus for reducing metal stock, by swaging it in successive increments, comprising in combination, a reducing device, means for turning and translating the stock, means for clamping the stock and holding it independently of said turning and translating means, and means for coordinating the action of said parts.

10. In apparatus for reducing metal stock by swaging it in successive increments, comprising in combination, a reducing device, means for turning and translating the stock, means for holding the stock to inhibit unauthorized turning and translation, and means for coordinating the action of said parts.

11. Apparatus for reducing stock by intermittent action thereon, comprising in combination, swaging devices for intermittently working upon and releasing the stock, means for engaging said stock to change its position when released, and means for engaging the stock to hold it while said swaging devices are working on it.

12. Apparatus for reducing stock by intermittent action thereon, comprising in combination, swaging devices for intermittently working upon and releasing the stock, means for engaging the stock at times while being worked upon by said swaging devices to hold it longitudinally, and resilient means associated with said stock engaging means to provide a limited opposed movement to said stock.

13. Apparatus for reducing tubular stock by intermittent action thereon, comprising in combination, swaging devices for intermittently working upon and releasing said stock, and means for engaging the stock at times while being worked upon by said swaging devices for holding it against substantial longitudinal movement, said holding means including a fixed frame, jaw holders slidably mounted in said frame, stock gripping jaws longitudinally splined to said jaw holders so as to be interchangeable, latches engaging one end of said jaws for holding them in position, a spring pressed abutment engaging the other end of said jaws for permitting a limited opposed longitudinal movement to said jaws, toggle levers and links and a fluid operated piston for clamping said jaws upon the stock, and springs for releasing said jaws.

14. Apparatus as set forth in claim 13 in which means is provided for eliminating the action of said stock holding means.

15. Apparatus for reducing tubular stock upon a mandrel comprising in combination, intermittently acting swaging devices mounted in a reciprocatory saddle, means for intermittently and alternately gripping-and-turning and gripping-and-feeding the stock between actions of the swaging devices, and means for intermittently gripping and holding the stock during the actions of the swaging devices.

In testimony whereof, I have signed my name to this specification this 28th day of April 1930.

GEORGE B. COE.